US006896423B2

(12) United States Patent
Arbuckle et al.

(10) Patent No.: US 6,896,423 B2
(45) Date of Patent: May 24, 2005

(54) CAMERA MOUNTING ENCLOSURE AND METHOD OF INSTALLATION

(75) Inventors: James F. Arbuckle, Fresno, CA (US); Alexey Pokrovsky, Fresno, CA (US)

(73) Assignee: Pelco, Clovis, CA (US)

( * ) Notice: Subject to any disclaimer, the term of this patent is extended or adjusted under 35 U.S.C. 154(b) by 0 days.

(21) Appl. No.: 10/664,298

(22) Filed: Sep. 16, 2003

(65) Prior Publication Data

US 2004/0057717 A1 Mar. 25, 2004

Related U.S. Application Data

(60) Provisional application No. 60/412,515, filed on Sep. 20, 2002.

(51) Int. Cl.[7] .............................................. G03B 17/00
(52) U.S. Cl. ........................ 396/427; 348/143; 348/150
(58) Field of Search .......................... 396/427; 348/143, 348/150, 151; 220/3.7

(56) References Cited

U.S. PATENT DOCUMENTS

| | | | | |
|---|---|---|---|---|
| 3,739,703 A | | 6/1973 | Behles | |
| 4,080,629 A | | 3/1978 | Hammond et al. | |
| 4,160,999 A | | 7/1979 | Claggett | |
| 4,320,949 A | | 3/1982 | Pagano | |
| 4,764,008 A | | 8/1988 | Wren | |
| 4,833,534 A | | 5/1989 | Paff et al. | |
| 4,901,146 A | | 2/1990 | Struh et al. | |
| 5,028,997 A | | 7/1991 | Elberbaum | |
| D325,212 S | | 4/1992 | Elberbaum | |
| 5,181,120 A | | 1/1993 | Hickey et al. | |
| 5,223,872 A | | 6/1993 | Stiepel et al. | |
| 5,394,184 A | | 2/1995 | Anderson et al. | |
| 5,394,209 A | | 2/1995 | Stiepel et al. | |
| 5,418,567 A | | 5/1995 | Boers et al. | |
| 5,627,616 A | | 5/1997 | Sergeant et al. | |
| 5,689,304 A | | 11/1997 | Jones et al. | |
| D388,450 S | | 12/1997 | Hamano et al. | |
| 5,818,519 A | | 10/1998 | Wren | |
| D403,340 S | | 12/1998 | Arbuckle | |
| 5,905,923 A | | 5/1999 | Chitsaz et al. | |
| 5,913,439 A | * | 6/1999 | Von Arx | 220/3.7 |
| D412,924 S | | 8/1999 | Hiraguchi | |
| D414,504 S | | 9/1999 | Madden | |
| D415,509 S | | 10/1999 | Hiraguchi | |
| 5,966,176 A | | 10/1999 | Chow et al. | |
| D424,087 S | | 5/2000 | Frick et al. | |
| 6,061,087 A | | 5/2000 | Schieltz et al. | |
| 6,234,691 B1 | | 5/2001 | Jones et al. | |
| 6,268,882 B1 | | 7/2001 | Elberbaum | |
| D449,630 S | | 10/2001 | Rak et al. | |
| D452,696 S | | 1/2002 | Fenton | |
| D453,350 S | | 2/2002 | Fenton et al. | |
| 6,354,749 B1 | | 3/2002 | Pfaffenberger, II | |
| 6,357,936 B1 | | 3/2002 | Elberbaum | |
| 6,476,856 B1 | | 11/2002 | Zantos | |
| 6,742,942 B2 | * | 6/2004 | Hering et al. | 396/427 |

* cited by examiner

*Primary Examiner*—David M. Gray
(74) *Attorney, Agent, or Firm*—Mark D. Miller

(57) ABSTRACT

A dual-purpose mounting structure and enclosure for a surface mounted surveillance camera system used alternatively to mount a camera system including back box directly onto a surface, or to mount the camera system such that the back box is recessed behind the surface. The enclosure and mount includes a back box having a flush flange assembly and a detachable surface mountable adaptor. For a surface mount, the adaptor is attached directly to the flush flange for mounting the enclosure onto a planar surface such as below a ceiling line. For a recessed mount, an opening is provided in the planar surface, the adaptor is inverted and placed around this opening on the opposite side of the planar surface, the back box is inserted through the opening and into the adaptor, and the adaptor is attached to the back box assembly.

20 Claims, 5 Drawing Sheets

CAMERA MOUNTING ENCLOSURE AND METHOD OF INSTALLATION

This application claims the benefit of provisional application No. 60/412,515 filed on Sep. 20, 2002.

BACKGROUND OF THE INVENTION

1. Field of the Invention

The present invention relates to camera enclosures, and more particularly to a surface mountable enclosure for a surveillance camera system that can alternatively be used for either exposed or recessed mounting of a surveillance camera system, as well as methods of installation thereof.

2. Description of the Prior Art

In the field of surveillance cameras, it is often desirable for the camera to be mounted on or in the ceiling or soffit in a room, or underneath an outdoor eave. In many cases, all of the surveillance camera components, including the camera, its motors and mechanics, are mounted inside a large enclosure that is attached to and hangs down from the lower surface of the ceiling. In order to protect the camera from outside elements while maximizing the camera viewing area below the ceiling surface, a transparent dome is often provided as part of the enclosure.

It is often desirable for space, convenience or conspicuousness purposes, to reduce the number of components that protrude below the ceiling line. In these circumstances, less exposure of the surveillance camera system below the ceiling line results in a less bulky appearance on the ceiling, and the camera dome and mount may more closely resemble a light fixture. Such recessed or flush mounting takes up less ceiling space and draw less attention to the camera enclosure. In order to accomplish recessed mounting, the back box containing the camera motors and mechanics must be mounted at or above the ceiling line, so that only the camera dome (containing the camera itself) and a peripheral trim ring extend below the line.

Existing camera mounting structures and enclosures tend to be bulky and cumbersome. Some structures are designed solely to be mounted on a surface, and therefore extend conspicuously outward therefrom. Such structures do not provide any means to reduce this extension, as exemplified by the disclosures in U.S. Pat. Nos. 5,028,997 and 5,818,519, as well as D-388,450, D-412,924, and D-415,509, among others. Other devices include back box structures that are partially recessed, but extend both above and below the ceiling line, such as those disclosed in U.S. Pat. Nos. 3,739,703 and 4,160,999. Then there are devices such as those disclosed in U.S. Pat. Nos. 4,833,534; 4,901,146; 5,121,215; 5,223,872; 5,394,184; 5,627,616; and 6,234,691, among others, which include large back box assemblies that are mounted entirely above the ceiling line, with only a dome extending below.

Most of the mounting structures identified above are designed primarily for installation in a suspended ceiling, where there is space above the suspended ceiling, and where it is relatively easy to cut a hole in (or remove/replace) a ceiling panel for installation. For example, the housing of U.S. Pat. No. 4,764,008 is designed specifically for use with a suspended ceiling.

It is apparent from a review of the above that there is no single camera enclosure mount that can be used for both surface mounting and recessed mounting of surveillance camera systems, such that a different enclosure or structure must be selected for each type of mounting situation. This is exemplified in U.S. Pat. No. 6,268,882, where several different camera mounting structures are disclosed, one for a surface mount, another for a recessed mount and yet another for a pendant mount.

It is therefore desirable to provide a dual-purpose mounting structure and enclosure for a surface mounted surveillance camera system that can alternatively be used either (a) to provide a large surface mounted enclosure for holding all of the camera components outside the surface, or (b) to provide a recessed enclosure in which the camera back box and many of the camera system components are mounted behind the surface (e.g. above the ceiling line), leaving a smaller and less conspicuous fixture extending outward.

SUMMARY OF THE INVENTION

The present invention provides a dual-purpose mounting structure and enclosure for a surface mounted surveillance camera system which can be used to mount a camera system and back box directly onto a surface, or which can alternatively be used to mount the camera system so that the back box is recessed behind the surface. The enclosure and mount includes a back box having a preferably annular flush flange assembly and a detachable surface mountable adaptor. For a surface mount, the preferably annular adaptor is attached directly to the flush flange for mounting the enclosure onto a planar surface, such as below a ceiling line. In such a surface mount, the adaptor is deployed between the flush flange and the surface, and covers the back box providing an aesthetically appealing appearance for the enclosure.

Alternatively, the invention may be used for a recessed mount of the camera system. In a recessed mount, an opening is provided in the planar surface through which the back box is inserted. This allows the flush flange to fit directly against the surface. The adaptor is inverted and placed on the opposite side of the planar surface, and is attached to the back box assembly using screws, rivets or other attachment devices which extend from the flush flange through the opening and into the adaptor. Only the flush flange and adjacent dome extend below the surface, with the back box and the remainder of the camera system being recessed behind the surface (e.g. above the ceiling line). This leaves a smaller and less conspicuous but aesthetically pleasing fixture below the line.

To install a surface mounted camera using the present invention, the adaptor is engaged with the back box and flush flange assembly. This assembly is, in turn, attached to the surface using screws, rivets or other attachment devices. The camera system may be inserted into the assembly before or after it is mounted to the surface. The adaptor has a tapered outer surface leading to a large opening, and the flush flange fits neatly against this opening to provide a complete unit having an outwardly pleasing appearance.

To install a recessed mounted camera using the present invention, an opening is first cut into the planar surface for receiving the back box. The adaptor is deployed on the opposite side of this opening for receiving the back box and flange assembly containing the camera system. The assembly is inserted into the opening and attached to the adaptor using screws, rivets or other attachment devices which extend from the flush flange through the opening and into the adaptor. In an alternative embodiment, the opening in the surface may be sized such that the back box and flange assembly are attached directly to the surface, without use of the adaptor.

It is therefore a primary object of the present invention to provide a dual-purpose mounting structure and enclosure for a camera assembly having an adaptor that may alternatively be used either as part of an exposed enclosure for a surface mount, or as a support structure behind the surface for a recessed mount.

It is also an important object of the present invention to provide methods for mounting a camera system on a planar surface in either a surface or recessed position using the same mounting components.

Additional objects of the invention will be apparent from the detailed descriptions and the claims herein.

DETAILED DESCRIPTION

Figure 1:
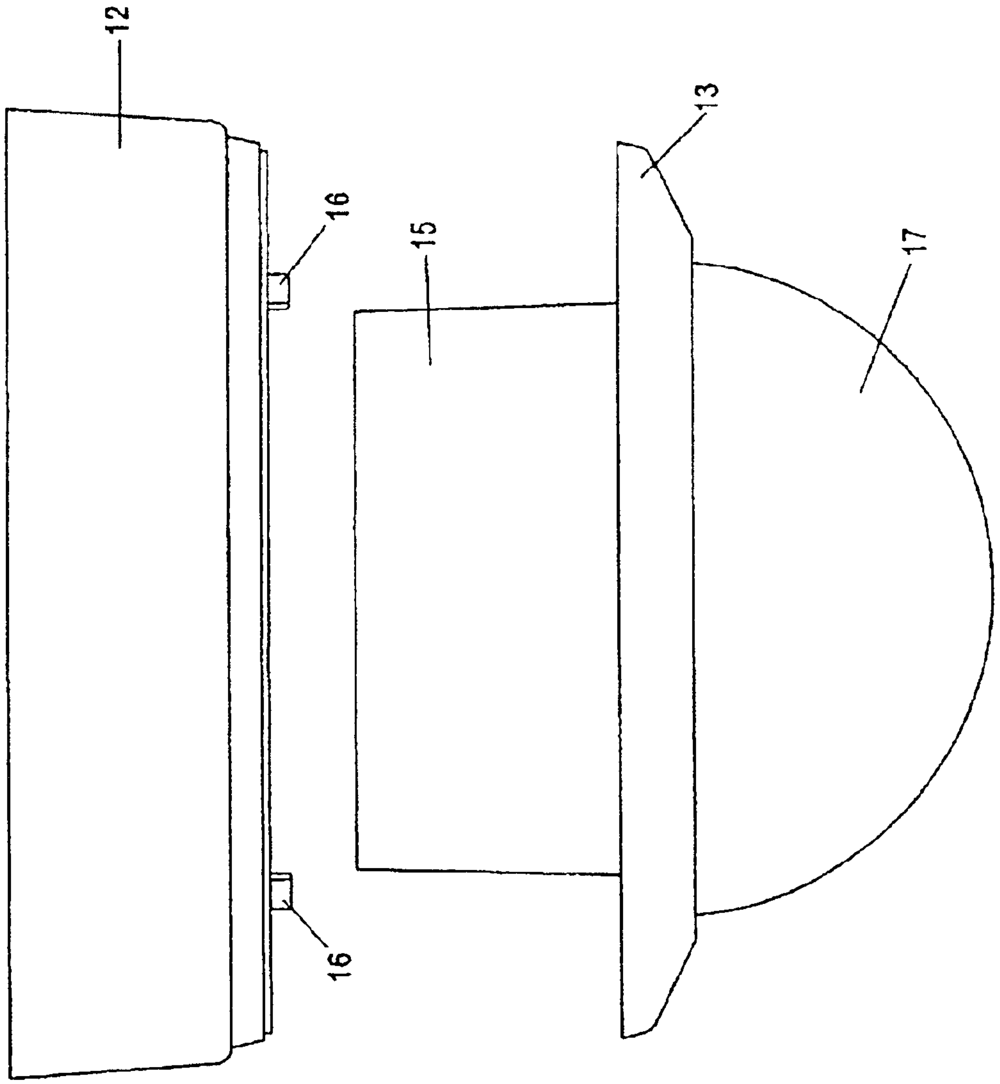
FIG. 1 is a side view of the mounting structure of the present invention showing the dome and back box assembly detached from the mounting adaptor.

Referring to the drawings wherein like reference characters designate like or corresponding parts throughout the several views, it is seen that the mounting device of the present invention includes a back box assembly 15 having an opening 11 at one end that is attached to a tapered flange or trim piece 13 having a central aperture 14 therein. Back box 15 is designed to hold some or all of a surveillance camera system including without limitation the camera and related electronics, operating components, motors and mechanical assemblies. The camera itself may protrude through opening 11 in back box 15 and aperture 14 of flange 13 where it is protected by a dome 17. Aperture 14 is preferably the same size as the opening in back box and flange 13 is preferably integrally attached thereto. However, aperture 14 may be smaller than opening 11 so that flange 13 holds back box 15 in place. Alternatively, aperture 14 may be larger than the opening in back box 15, in which case either some portion of back box 15 extends outward so that flange 13 still holds back box 15 in place, or at least two finger structures 26 are provided with flange 13 which project out to hold back box 15 in place. A removable preferably transparent dome 17 is provided for locking engagement with flange 13 in order to cover the camera.

Figure 4:
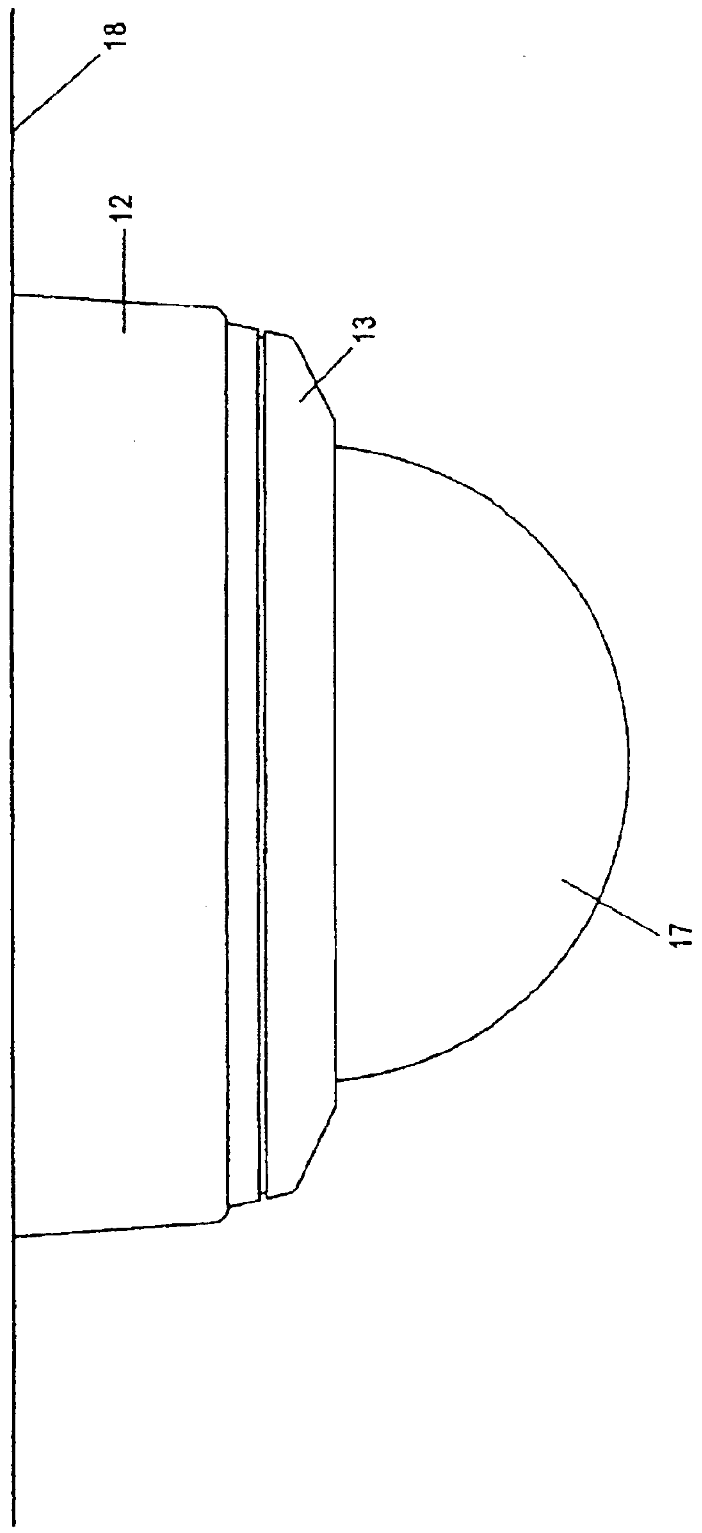
FIG. 4 is a side view of the assembled mounting structure attached to the surface of a ceiling.
Figure 5:
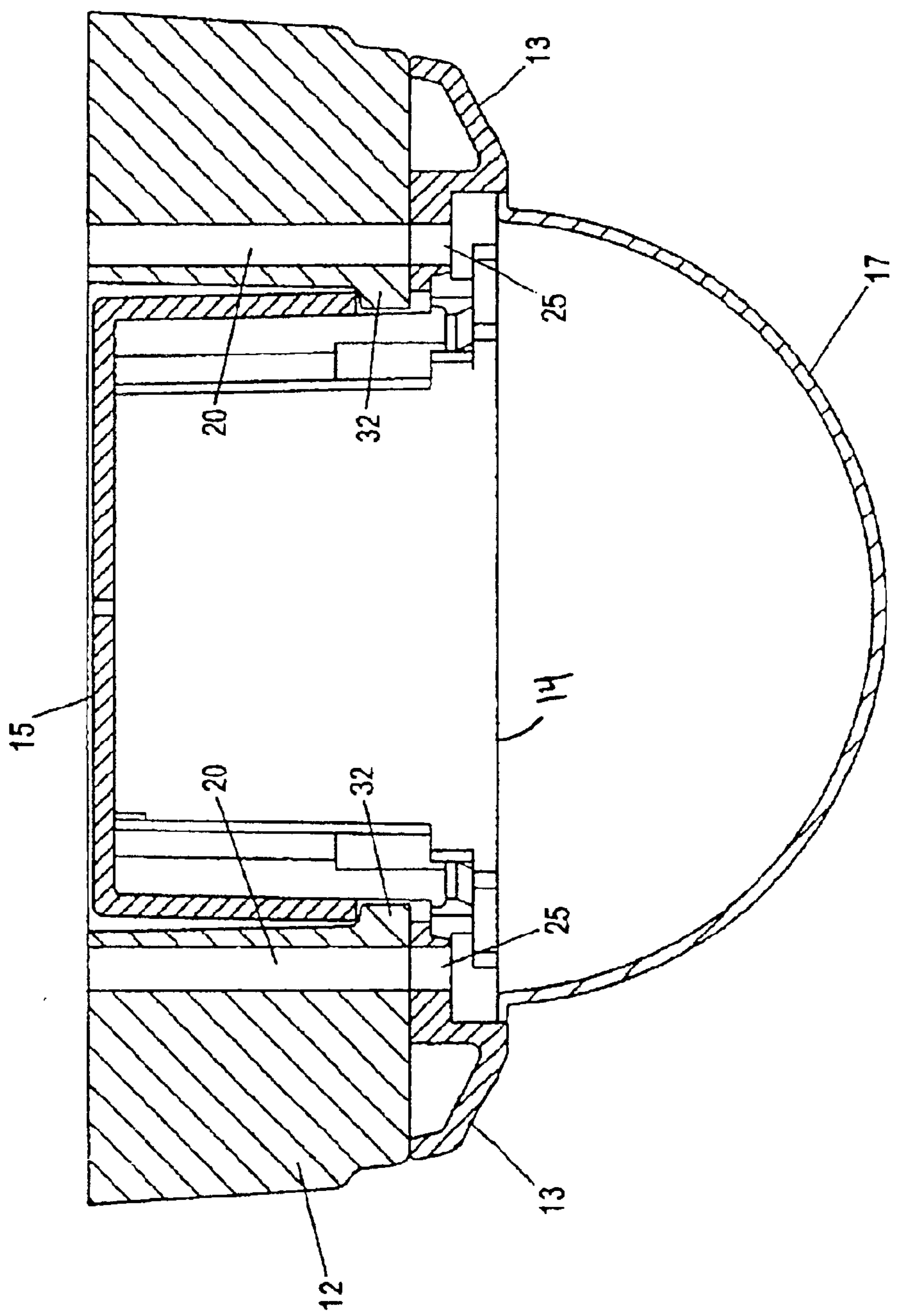
FIG. 5 is a cross-sectional view of the configuration of FIG. 4.

A detachable surface mountable adaptor piece or ring 12 is provided as shown in FIG. 1 and may be attached to annular flange 13 or back box 15. The combination of the back box 15, flange 13, dome 17 and adaptor 12 may be attached together and mounted as a single unit below the ceiling surface 18 as shown in FIGS. 4 and 5. This provides a surface mount for the surveillance camera system. In this configuration, at least two tabs 32 located on adaptor 12 lock into corresponding openings 33 on back box 15 to hold adaptor 12 and back box 15 together, as shown in FIG. 5. Orientation tabs 16 are provided as guides on adaptor 12 that fit into corresponding slots on flange 13. Screws, rivets or other attachment devices 21 are inserted through a plurality of openings 25 in flange 13 and through openings 20 in adaptor 12 to attach the combination to a surface such as a ceiling 19.

Figure 2:
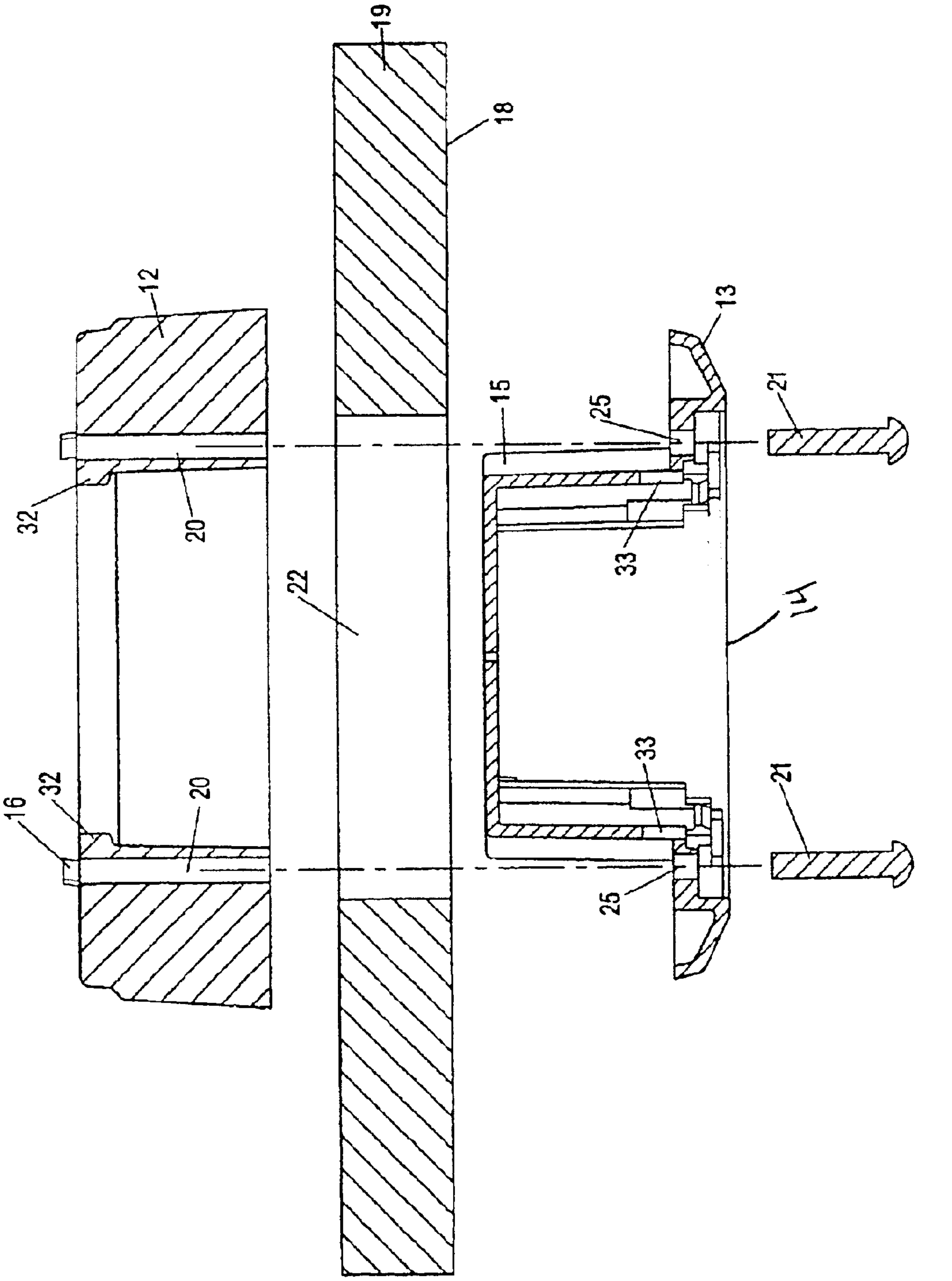
FIG. 2 is a cross sectional partially exploded view of the invention showing the method of recessed attachment to a ceiling or other plane.
Figure 3:
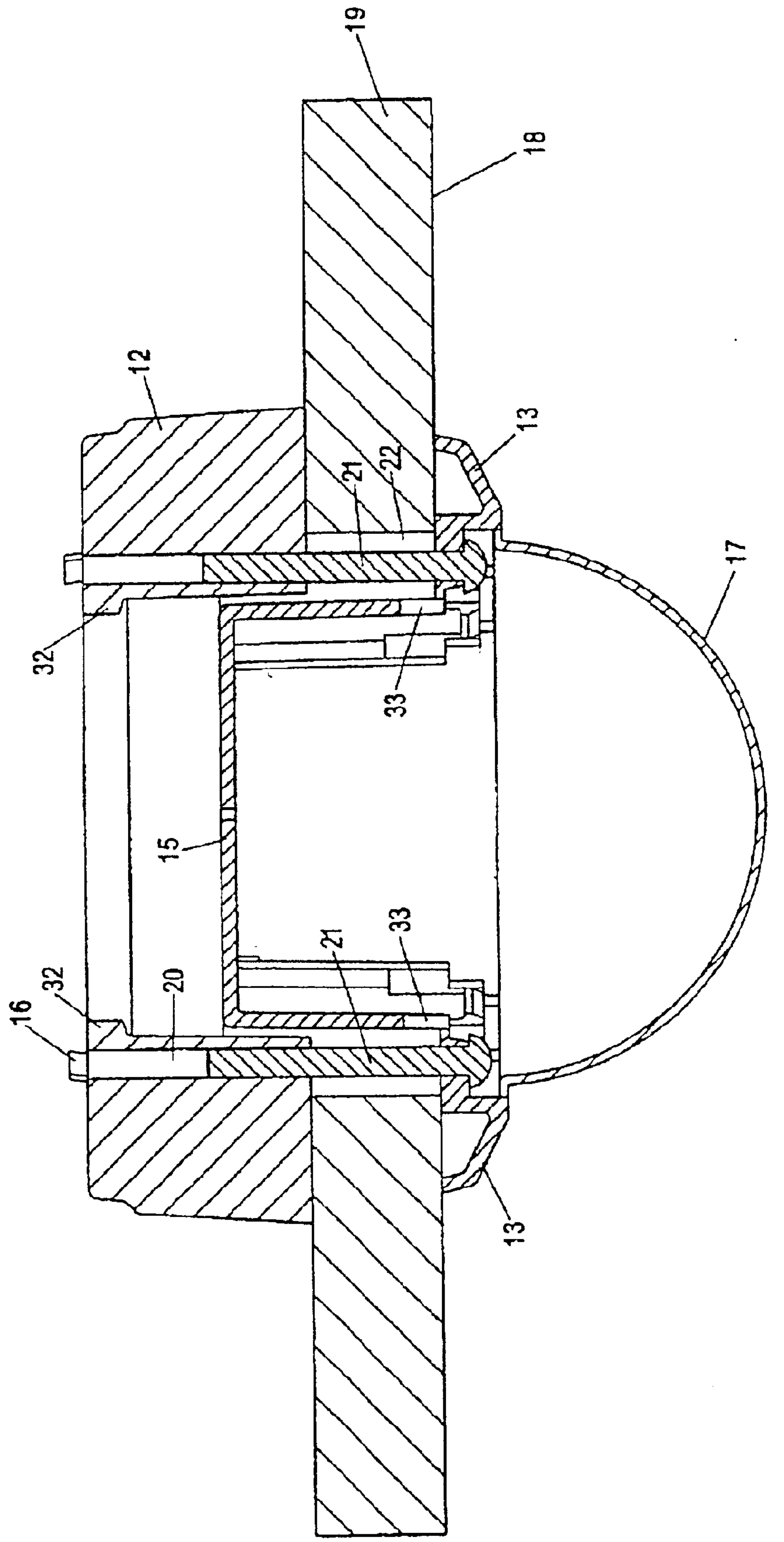
FIG. 3 is a cross sectional view of the invention installed in a recessed configuration on a ceiling.

The invention may also be used to provide a recessed or flush mount as shown in FIGS. 2 and 3. For recessed mounting, a large opening 22 must be cut in the ceiling, wall or other planar surface 19 to which the mount will be attached, in order to receive back box 15. Adaptor 12 is detached, inverted and placed on the opposite side of the ceiling or planar surface 19, straddling opening 22. Screws, rivets or other attachment devices 21 are then inserted through a plurality of openings 25 in flange 13, through opening 22 in ceiling 19, and into receiving openings 20 in adaptor 12 as shown in FIGS. 2 and 3. Tightening the attachment devices 21 into openings 20 holds flange 13 flush against the ceiling surface 18 while also holding back box 15 securely in place in ceiling opening 22 as shown in FIG. 3. Once the camera system is installed, dome 17 may be attached.

Installation of a surface mounted camera using the present invention is accomplished by first attaching the adaptor 12 to back box 15 by engaging tabs 32 on adaptor 12 into openings 33 on back box 15. This forms a single unit made up of the assembly of back box 15, flange 13 and adaptor 12, as shown in FIG. 5. Guiding clips, slotted flanges or other structures 16 on adaptor 12 fit into corresponding slots on flange 13. The camera system and related electronics may then be inserted into back box 15. This assembly is attached to the surface (e.g. ceiling 19) using screws, rivets or other attachment devices 21 which are inserted through openings 25 in flange 13, through openings 20 in adaptor 12, and then into the surface 19. This causes flange 13 and adaptor 12 to be exposed below ceiling line 18. If not already accomplished, the camera and related electronics may then be inserted into the back box 15, and dome 17 engaged over aperture 14 in flange 13.

Installation of a recess mounted camera using the present invention is accomplished by first providing an opening 22 in the surface (e.g., ceiling 19) for receiving the back box 15. Adaptor 12 is preferably inverted and then deployed on the opposite side of opening 22 to receive a portion of the back box 15 containing the camera system as shown in FIG. 3. Flange 13 is attached to the adaptor 12 using screws, rivets or other attachment devices 21 which extend from the flange 13 through the opening 22 and are attached to openings 20 in the adaptor 12. The dome 17 is then attached to flange 13. Alternatively, opening 22 in surface 19 may be sized such that the back box and flange assembly 13–15 are attached directly to surface 19, without use of the adaptor 12.

It is to be appreciated that while the description of the surveillance camera mounting structure herein has been directed primarily to ceiling mounting, that the invention may be similarly attached to any planar surface at any angle, including without limitation a wall, floor or other surface. It is also to be appreciated that while the back box 15 is illustrated as having a generally cylindrical shape, and flange 13 and adaptor 12 are illustrated as having a generally annular shape, these components may be provided in any appropriate shape or configuration. For example, and without limitation, back box 15 may have a shape that is generally square, rectangular, oblong, oval, elliptical, hexagonal, octagonal, or the like. Similarly, flange 13 may have a shape that is generally square, oval, elliptical, hexagonal, octagonal, or the like. Finally, adaptor 12 may have a shape that is generally square, oval, elliptical, hexagonal, octagonal, or the like—even if flange 13 does not have a corresponding shape. Dome 17 must allow the camera mounted therein to receive visual images therethrough, and may be transparent, smoked, tinted, mirrored or otherwise color filtered according to the conditions and requirements of deployment.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

What is claimed is:

1. A structure for mounting a surveillance camera on a surface comprising a back box having an opening therein, a flange attached to said back box adjacent to said opening, and an adaptor for attachment to said flange wherein said adaptor is adapted selectively to be mounted on said surface, and alternatively to be mounted behind said surface.

2. The structure of claim 1 wherein said adaptor is located between said flange and said surface when it is selectively mounted on said surface.

3. The structure of claim 2 wherein said flange touches against said surface when said adaptor is selectively mounted behind said surface.

4. The structure of claim 1 wherein an aperture is provided in said flange that is smaller than said opening in said back box.

5. The structure of claim 1 wherein an aperture is provided in said flange that is larger than said opening in said back box, and a portion of said back box extends outward beyond said aperture.

6. The structure of claim 1 wherein an aperture is provided in said flange that is larger than said opening in said back box, and a plurality of fingers are provided on said flange to support said back box.

7. The structure of claim 1 wherein a plurality of slots are provided on said back box and a corresponding plurality of tabs are provided on said adaptor for mating engagement of said adaptor to said back box when said adaptor is mounted on said surface.

8. The structure of claim 7 wherein said flange and said adaptor each have a generally annular shape, said back box has a generally cylindrical shape, and a dome provided for engagement with said flange.

9. The structure of claim 1 wherein said adaptor is inverted when alternatively mounted behind said surface.

10. The structure of claim 8 wherein an opening is provided in said surface, and a plurality of attachment devices are inserted through said surface opening for attaching said flange to said adaptor when alternatively mounted behind said surface.

11. A structure for mounting a surveillance camera on a front surface of a panel having front and back surfaces comprising a back box having an opening at one end, a flange having a central aperture therein attached to said back box adjacent to said opening, and an adaptor for attachment to said flange wherein said adaptor is adapted selectively to be mounted to the front surface of said panel, and alternatively to be mounted on the back surface of said panel.

12. The structure of claim 11 wherein a plurality of slots are provided on said back box and a corresponding plurality of tabs are provided on said adaptor for mating engagement of said adaptor to said back box when said adaptor is mounted to the front surface of said panel.

13. The structure of claim 11 said aperture is smaller than said opening in said back box.

14. The structure of claim 11 wherein said aperture is larger than said opening in said back box, and a portion of said back box extends outward beyond said aperture.

15. The structure of claim 11 wherein said aperture is larger than said opening in said back box, and a plurality of fingers are provided on said flange to support said back box.

16. The structure of claim 11 wherein said flange and adaptor have a generally annular shape, said back box has a generally cylindrical shape, and a dome provided for engagement with said flange.

17. The structure of claim 11 wherein said adaptor is inverted when alternatively mounted behind said surface.

18. The structure of claim 17 wherein an orifice is provided in said surface for receiving said back box, and a plurality of attachment devices are inserted through said orifice for attaching said flange to said adaptor when alternatively mounted behind said surface.

19. A camera support assembly comprising a back box having an opening therein, a peripheral flange attached to said back box adjacent to said opening, and an adaptor attachable to said flange for alternatively mounting said camera support assembly on a surface in accordance with two separate and distinct modes of operation, a first mode of operation comprising mounting said adaptor on said surface between said flange and said surface, and a second mode of operation comprising providing an orifice in said surface for receiving said back box and mounting said adaptor behind said surface adjacent to said orifice.

20. A method of mounting a surveillance camera on a surface comprising the steps of:

a) installing a camera and related components into a support assembly comprising a back box having an opening therein for receiving said components, said opening being adjacent to an attached flange having an aperture therein through which said camera protrudes;

b) attaching said assembly to said surface using an adaptor for alternatively mounting said assembly in accordance with two separate and distinct modes of operation, a first mode of operation comprising mounting said adaptor on said surface between said flange and said surface, and a second mode of operation comprising providing an orifice in said surface and mounting said adaptor behind said surface adjacent to said orifice using a plurality of devices inserted through said orifice for attaching said flange to said adaptor; and c) engaging a dome with said flange to cover said camera.

* * * * *